Oct. 18, 1927.

D. E. GOMMEL 1,646,369

HACK SAW

Filed Feb. 1, 1926

INVENTOR.
Dewey E. Gommel,
BY
Hood + Hahn
ATTORNEYS

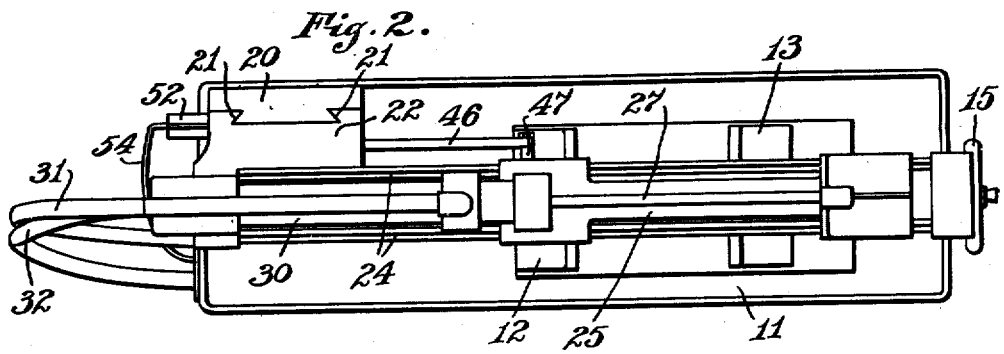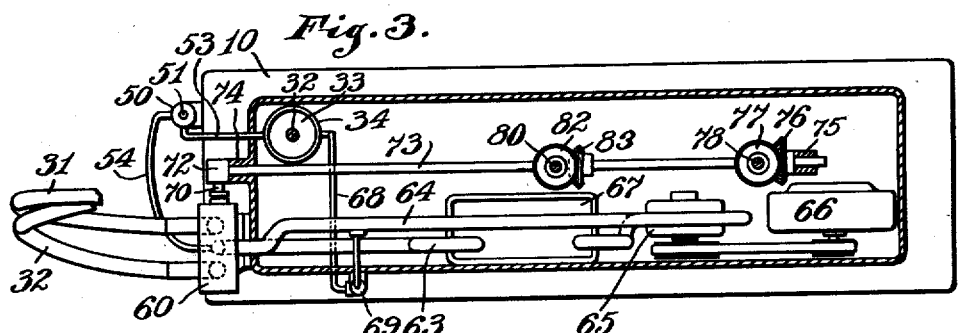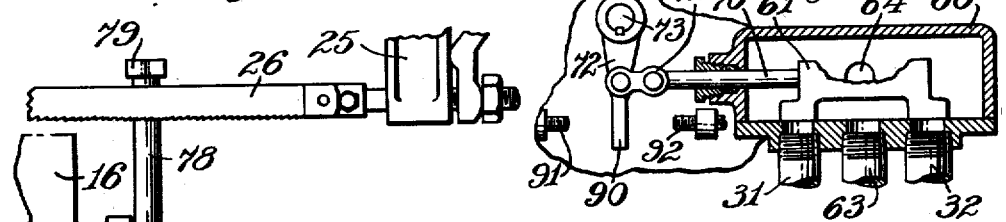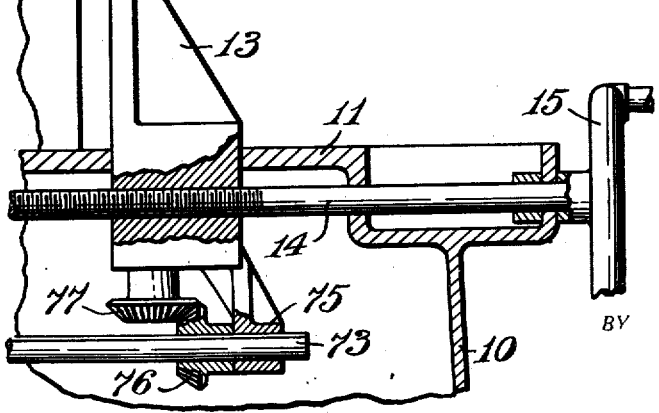

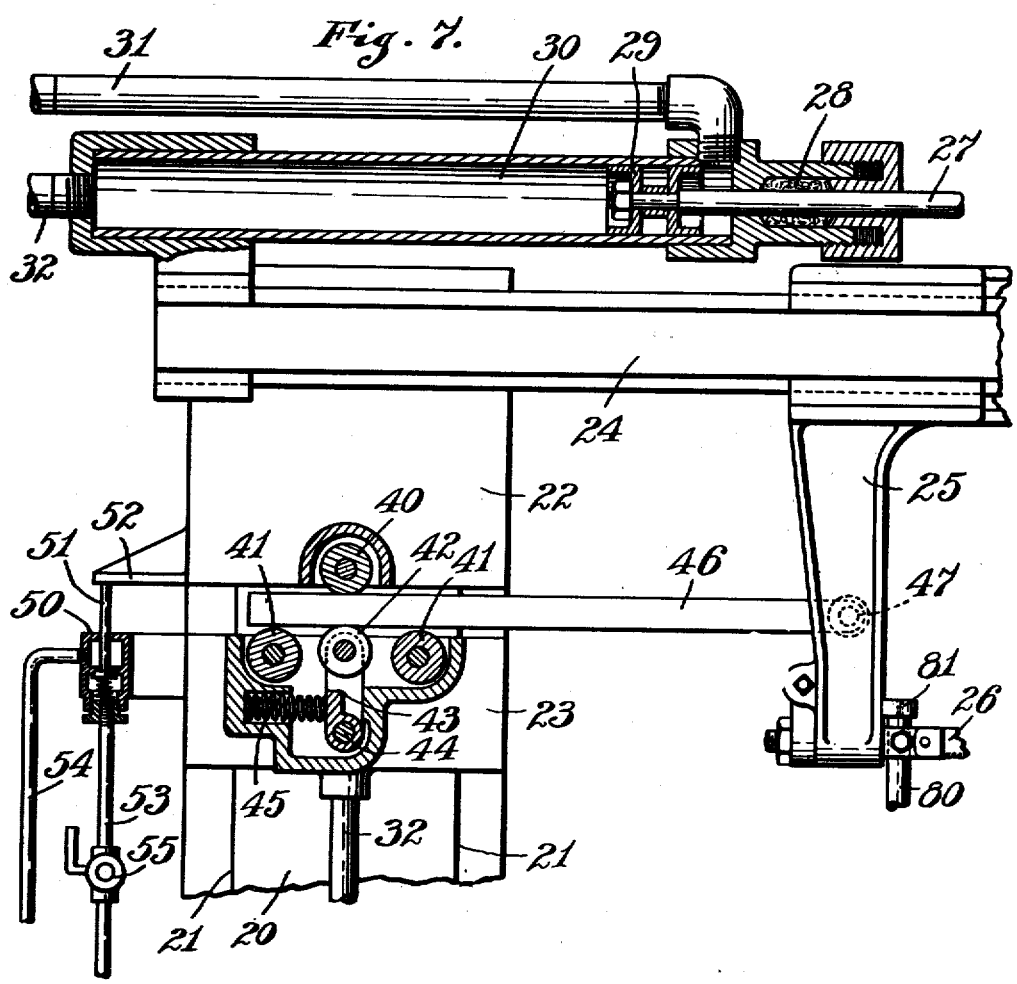

Patented Oct. 18, 1927.

1,646,369

UNITED STATES PATENT OFFICE.

DEWEY E. GOMMEL, OF INDIANAPOLIS, INDIANA, ASSIGNOR TO E. C. ATKINS & COMPANY, OF INDIANAPOLIS, INDIANA, A CORPORATION OF INDIANA.

HACK SAW.

Application filed February 1, 1926. Serial No. 85,162.

The object of my invention is to produce improvements in details of construction of a reciprocating hack saw, or other cutting tool, particularly in the fluid pressure means for controlling the cutting position of the saw and for raising the saw away from the work during return strokes.

The accompanying drawings illustrate my invention.

Fig. 2 is a plan view;

Fig. 3 is a horizontal section on line 3—3 of Fig. 1;

Fig. 4 is a vertical section, on an enlarged scale, of the movable clamping jaw and adjacent parts;

Fig. 5 is a vertical section, on an enlarged scale on line 5—5 of Fig. 1;

Fig. 6 is a fragmentary horizontal section of the primary valve reversing mechanism, and Fig. 7 is a vertical section, on an enlarged scale, through the saw reciprocating cylinder and a portion of the saw elevating mechanism.

Figure 1:
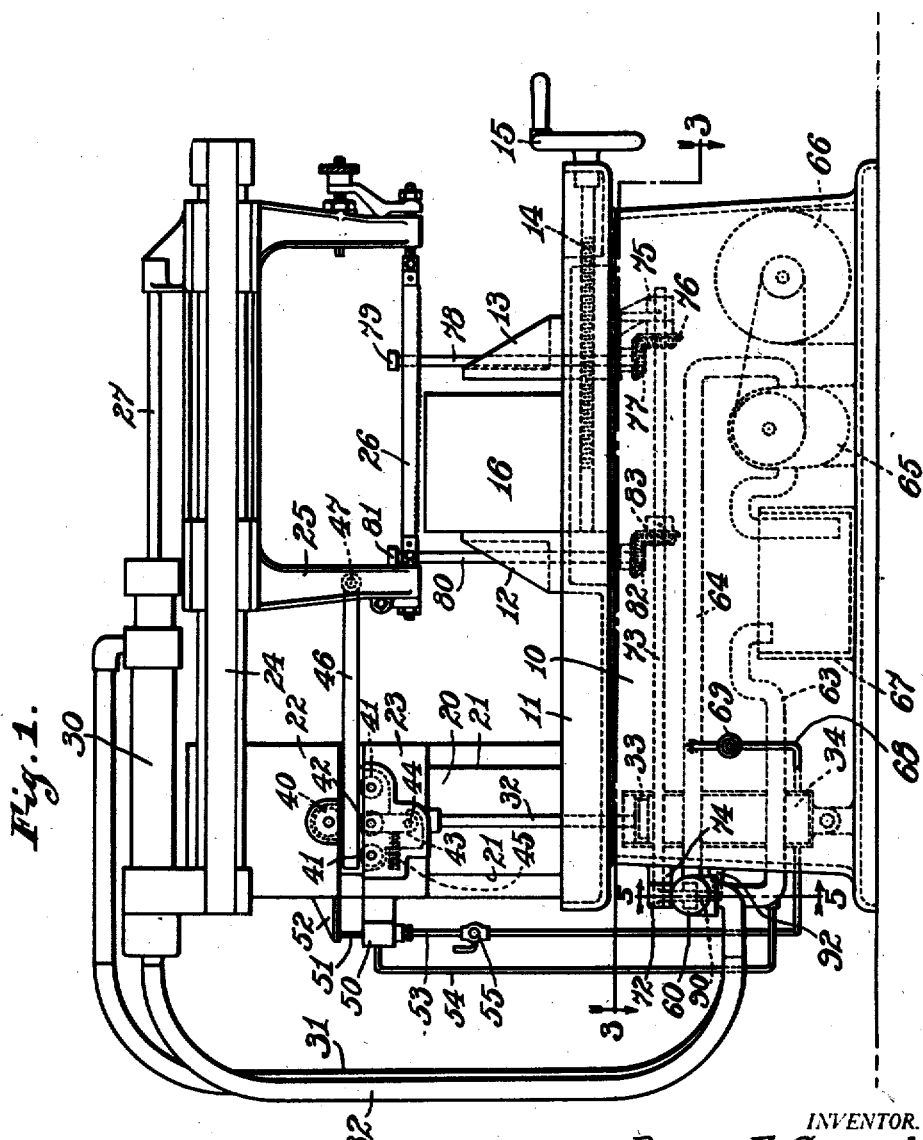
Fig. 1 is a side elevation of a machine embodying my improvements.

In the drawings 10 indicates a suitable supporting base formed at its upper end into a work receiving platform or table 11 provided with a stationary jaw 12 and a movable jaw 13 which is mounted in suitable slides in table 11 and shiftable by means of the threaded screw 14 and hand wheel 15, so that the material 16 to be cut may be clamped in the usual manner between the jaws 12 and 13.

Erected from the base 10 is a vertical standard 20 having vertical guideways 21 upon which are slidably mounted a block 22 and a block 23.

Block 22 carries, near its upper end, a saw guide 24 upon which is reciprocably mounted a saw frame 25 in which may be mounted a saw blade 26.

Attached to the frame 25 is a piston rod 27 projected through a suitable packing gland 28 and carrying a piston 29 in cylinder 30, said cylinder having pipes 31 and 32 leading into its opposite ends.

Block 23 lies below block 22 and is carried by the upper end of the piston rod 32 supported by a piston 33 in a vertical cylinder 34 (dotted lines Fig. 1), the arrangement being such that the entire weight of block 23 and block 22 together with the various parts carried thereby, including the saw guides and saw frame, will be supported by the liquid in cylinder 34.

The lower end of block 22 is provided with a roller 40 and the upper end of block 23 is provided with two fixed-axis rollers 41, 41 and a movable-axis roller 42 which is carried at the upper end of link 43 pivoted at 44 in block 23 and normally urged to its upper position by spring 45. Longitudinally slidable between roller 40 on one side and the rollers 41 and 42 on the other side is a tongue 46 pivoted at 47 on the saw frame 25 the arrangement being such that when roller 42 is in its upper position, finger 46 will be raised up out of contact with rollers 41.

Mounted on block 23 is a valve casing 50 in which is mounted a spring pressed poppet valve 51 the stem of which is projected upwardly so as to just contact with a plate 52 carried on block 22 when block 22 is at its greatest distance from block 23, as will be hereafter explained. Leading to valve casing 50 is a supply pipe 53 and leading from said casing is a drain pipe 54, a drain cock 55 being arranged in pipe 53.

Pipes 31 and 32 communicate with a valve casing 60 in which is mounted a V-valve 61. Leading from casing 60 beneath valve 61 is a drain pipe 63 into which pipe 54 discharges. Leading into casing 60 is a supply pipe 64 which leads from suitable pump 65 (dotted lines Fig. 1) which may be operated by a suitable motor 66 and may draw its supply from a drainage sump 67 into which pipe 63 discharges. Pump 65 may have the usual spring pressed by-pass. Leading from pipe 64 into the lower end of cylinder 34 is a supply pipe 68 provided with a valve 69. Pipe 53 at its lower end communicates with the lower end of cylinder 34.

Valve 61 is provided with a stem 70 connected by link 71 with a crank 72 on a rock shaft 73 journaled at one end in a bearing 74 on base 10 and at the other end in a bracket 75 carried by the movable jaw 13. Splined on shaft 73 adjacent bracket 75 is a bevel pinion 76 which meshes with a bevel pinion 77 carried at the lower end of a rock shaft 78 journaled in jaw 13 and provided at its upper end with an arm 79 adapted to be engaged by the right hand arm (Fig. 1) of the saw frame. Journaled in jaw 12 is a rock shaft 80, similar to shaft 78, provided at its upper end with an arm 81, like arm 79, and at its lower end with a bevel pinion 82 which meshes with a bevel pinion 83 secured to shaft 73.

The operation is as follows:—In Fig. 1 the saw frame is shown at the limit of its non-cutting stroke; roller 42 is in its upper position; finger 46 is out of contact with rollers 41, 41; the saw blade 26 is held out of contact with the work; cylinder 34 is full of suitable liquid, such as oil, and valve 61 has been shifted so as to bring pipe 31 into communication with the interior of casing 60; valve 51 is seated so as to close communication between pipe 53 and 54 through valve casing 50 and the stem of valve 51 is in contact with plate 52. Flow of liquid through pipe 31 into cylinder 30 will drive the saw frame to the left through its cutting stroke. The initial movement of this cutting stroke causes finger 46 to shift roller 42 to the left (Fig. 7) thus permitting block 22 to drop slightly whereupon valve 51 is opened and the weight resting on block 23 ejects a small quantity of liquid from cylinder 34 through valve casing 50 and pipe 54 so that block 23 may move downwardly until it has separated from block 22 an amount sufficient to permit valve 51 to close. The leakage past valve 51 will continue as long as plate 52 is capable of holding valve 51 open and this contact between plate 52 and the stem of valve 51 continues so long as blade 26 continues to cut into the material 16, so that the saw is free to progress through the material as rapidly as it is capable of progressing. When the end of the cutting stroke of the saw is approached, the right hand depending arm (Fig. 1) of the saw frame will engage finger 79 and rock shaft 73 so as to shift valve 61 to put pipe 31 into communication with the drainage pipe 63 and pipe 32 into communication with the left hand end of cylinder 30 so that the saw frame will promptly start upon its return, or non-cutting, stroke. By this time head 23 has moved downwardly enough to permit valve 51 to close so that further downward movement of the block 23 is arrested. Immediately upon the beginning of the return stroke of the saw frame, finger 46, being now moved to the right (Fig. 7) permits arm 43 to swing to the right, thus elevating roller 42 so that finger 46, acting upon roller 40, serves to raise block 22 just enough to free the teeth of saw 26 from the work during the return stroke of the saw.

In order that the speed of operation may be readily adjusted arm 72 may have an extension 90 capable of moving between the adjustable stops 91 and 92. By adjusting these stops the lead of valve 61 relative to the ports into pipes 31 and 32 may be varied thus varying the speed of the cutting stroke and return stroke, the return stroke being faster than the cutting stroke if the proper adjustment is made.

I claim as my invention:

1. In a hack saw, the combination of a saw guide, a saw frame reciprocably mounted on said guide, means providing a fluid support for said saw frame, means for reciprocating said saw frame, means for permitting leakage of the supporting liquid during the active stroke of the saw and means for raising said saw frame without changing the height of the fluid support during the non-active stroke of the saw.

2. In a hack saw, the combination of a saw guide, a saw frame reciprocably mounted on said guide, means providing a fluid support for said saw frame, means for reciprocating said saw frame, and means controlled by the reciprocating saw frame for permitting leakage of the supporting liquid during the active stroke of the saw.

3. The combination of a reciprocable cutting tool, means providing a fluid support for said cutting tool movable at an angle to the movement of reciprocation, means for reciprocating said tool, means for releasing said fluid support during reciprocation of the tool in one direction and means for raising said tool without changing the height of said fluid support during a stroke of the tool.

4. The combination of a reciprocable cutting tool, a support for said cutting tool movable at an angle to the movement of reciprocation, a second support subjacent the first support, fluid pressure means for supporting said second support, a valve controlling outflow from said fluid pressure means and means for opening said valve, said valve and opening means being carried respectively by the two supports, and means for separating the two supports during non-cutting reciprocation of the tool to close the valve during such stroke.

5. The combination of a reciprocating cutting tool, a support for said cutting tool, movable at an angle to the movement of reciprocation, fluid pressure means for sustaining said support, a valve controlling outflow from said fluid pressure means, means controlled by the reciprocating tool for holding said valve open during the major portion of the cutting stroke only of said tool.

6. The combination of a reciprocating cutting tool, a support for said cutting tool, movable at an angle to the movement of reciprocation, fluid pressure means for sustaining said support, a valve controlling outflow from said fluid pressure means, mean controlled by the reciprocating tool for holding said valve open during the major portion of the cutting stroke only of said tool and means controlled by non-cutting reciprocation of the tool for raising said tool from the work.

7. The combination of a reciprocable cutting tool, a support for said tool movable at an angle to the line of reciprocation, yieldable sustaining means for said support and means controlled by the reciprocating tool for releasing said yieldable sustaining means during the cutting stroke of the tool.

8. In a hack saw, the combination of a reciprocable saw frame, a guide for said frame, a block supporting said guide and movable along a line at an angle to the line of reciprocation, a second block subjacent the first block, a fluid pressure support for said second block, a valve controlling outflow from said fluid pressure support, means for opening said valve, said valve and opening means being carried respectively by the two blocks, and means controlled by the saw reciprocation, for alternately moving said blocks toward and from each other.

9. In a hack saw, a reciprocating frame, a guide for said frame, a block supporting said guide and movable along a line at an angle to the line of reciprocation, a second block subjacent the first block, a fluid pressure support for said second block, a valve controlling outlet from said fluid pressure support, means for alternately moving said two blocks toward and from each other, and means controlled by said alternate movement of said blocks for alternately opening and closing said valve.

10. In a hack saw, the combination of a reciprocable saw frame, a guide for said frame, a block supporting said guide and movable in a line at an angle to the line of reciprocation, a second block subjacent the first block, a yielding support for the second block, means by which said yielding support may be released, and means controlled by the reciprocating frame for actuating said releasing means to release the yielding support during cutting reciprocations of the cutting tool.

11. The combination of a reciprocable cutting tool, a support for said tool movable in a line at an angle to the line of reciprocation, a yielding support for said first mentioned support, means by which said yielding support may be alternately released and established, and means active during cutting reciprocations of the tool for activating said support releasing means.

12. The combination of a reciprocating tool, a block supporting said tool movable along a line at an angle to the line of reciprocation, a second block subjacent the first block, a finger carried by the reciprocating tool and slidably interposed between the two blocks and a member carried by one of said blocks and co-acting with said finger to separate the blocks during reciprocation of the tool in one direction.

13. The combination of a reciprocating tool, a block supporting said tool movable along a line at an angle to the line of reciprocation, a second block subjacent the first block, a finger carried by the reciprocating tool and slidably interposed between the two blocks and a member carried by one of said blocks and co-acting with said finger to separate the blocks during reciprocation of the tool in one direction, fluid pressure means for supporting the second block, a valve controlling outflow from said fluid pressure means and carried by one of said blocks, and means dependent upon tool reciprocation for holding said valve open during tool reciprocations in one direction.

14. The combination of a reciprocating tool, a block supporting said tool movable along a line at an angle to the line of reciprocation, a second block subjacent the first block, a finger carried by the reciprocating tool and slidably interposed between the two blocks, a link pivoted upon one of the blocks and engaging the finger, said link being biased toward a position tending to displace the finger laterally relative to the link carrying block.

15. The combination of a reciprocating tool, a block supporting said tool movable along a line at an angle to the line of reciprocation, a second block subjacent the first block, a finger carried by the reciprocating tool and slidably interposed between the two blocks, a link pivoted upon one of the blocks and engaging the finger, said link being biased toward a position tending to displace the finger laterally relative to the link carrying block, fluid pressure means for supporting the second block, a valve controlling outflow from said fluid pressure means and carried by one of said blocks, and means dependent upon tool reciprocation for holding said valve open during tool reciprocations in one direction.

In witness whereof, I DEWEY E. GOMMEL have hereunto set my hand at Indianapolis, Indiana, this 26th day of January, A. D. one thousand nine hundred and twenty-six.

DEWEY E. GOMMEL.

tion of the tool for raising said tool from the work.

7. The combination of a reciprocable cutting tool, a support for said tool movable at an angle to the line of reciprocation, yieldable sustaining means for said support and means controlled by the reciprocating tool for releasing said yieldable sustaining means during the cutting stroke of the tool.

8. In a hack saw, the combination of a reciprocable saw frame, a guide for said frame, a block supporting said guide and movable along a line at an angle to the line of reciprocation, a second block subjacent the first block, a fluid pressure support for said second block, a valve controlling outflow from said fluid pressure support, means for opening said valve, said valve and opening means being carried respectively by the two blocks, and means controlled by the saw reciprocation, for alternately moving said blocks toward and from each other.

9. In a hack saw, a reciprocating frame, a guide for said frame, a block supporting said guide and movable along a line at an angle to the line of reciprocation, a second block subjacent the first block, a fluid pressure support for said second block, a valve controlling outlet from said fluid pressure support, means for alternately moving said two blocks toward and from each other, and means controlled by said alternate movement of said blocks for alternately opening and closing said valve.

10. In a hack saw, the combination of a reciprocable saw frame, a guide for said frame, a block supporting said guide and movable in a line at an angle to the line of reciprocation, a second block subjacent the first block, a yielding support for the second block, means by which said yielding support may be released, and means controlled by the reciprocating frame for actuating said releasing means to release the yielding support during cutting reciprocations of the cutting tool.

11. The combination of a reciprocable cutting tool, a support for said tool movable in a line at an angle to the line of reciprocation, a yielding support for said first mentioned support, means by which said yielding support may be alternately released and established, and means active during cutting reciprocations of the tool for activating said support releasing means.

12. The combination of a reciprocating tool, a block supporting said tool movable along a line at an angle to the line of reciprocation, a second block subjacent the first block, a finger carried by the reciprocating tool and slidably interposed between the two blocks and a member carried by one of said blocks and co-acting with said finger to separate the blocks during reciprocation of the tool in one direction.

13. The combination of a reciprocating tool, a block supporting said tool movable along a line at an angle to the line of reciprocation, a second block subjacent the first block, a finger carried by the reciprocating tool and slidably interposed between the two blocks and a member carried by one of said blocks and co-acting with said finger to separate the blocks during reciprocation of the tool in one direction, fluid pressure means for supporting the second block, a valve controlling outflow from said fluid pressure means and carried by one of said blocks, and means dependent upon tool reciprocation for holding said valve open during tool reciprocations in one direction.

14. The combination of a reciprocating tool, a block supporting said tool movable along a line at an angle to the line of reciprocation, a second block subjacent the first block, a finger carried by the reciprocating tool and slidably interposed between the two blocks, a link pivoted upon one of the blocks and engaging the finger, said link being biased toward a position tending to displace the finger laterally relative to the link carrying block.

15. The combination of a reciprocating tool, a block supporting said tool movable along a line at an angle to the line of reciprocation, a second block subjacent the first block, a finger carried by the reciprocating tool and slidably interposed between the two blocks, a link pivoted upon one of the blocks and engaging the finger, said link being biased toward a position tending to displace the finger laterally relative to the link carrying block, fluid pressure means for supporting the second block, a valve controlling outflow from said fluid pressure means and carried by one of said blocks, and means dependent upon tool reciprocation for holding said valve open during tool reciprocations in one direction.

In witness whereof, I DEWEY E. GOMMEL have hereunto set my hand at Indianapolis, Indiana, this 26th day of January, A. D. one thousand nine hundred and twenty-six.

DEWEY E. GOMMEL.

Certificate of Correction.

Patent No. 1,646,369.　　　　　　　　　　Granted October 18, 1927, to

DEWEY E. GOMMEL.

It is hereby certified that error appears in the printed specification of the above-numbered patent requiring correction as follows: Page 2, line 126, claim 6, for the word "mean" read *means;* and that the said Letters Patent should be read with this correction therein that the same may conform to the record of the case in the Patent Office.

Signed and sealed this 8th day of November, A. D. 1927.

[SEAL.]
M. J. MOORE,
*Acting Commissioner of Patents.*

Certificate of Correction.

Patent No. 1,646,369.                                            Granted October 18, 1927, to
DEWEY E. GOMMEL.

It is hereby certified that error appears in the printed specification of the above-numbered patent requiring correction as follows: Page 2, line 126, claim 6, for the word "mean" read *means;* and that the said Letters Patent should be read with this correction therein that the same may conform to the record of the case in the Patent Office.

Signed and sealed this 8th day of November, A. D. 1927.

[SEAL.]                                                                    M. J. MOORE,
*Acting Commissioner of Patents.*